Feb. 28, 1967 J. H. HOLLAND 3,307,021

HELICAL DATA STORAGE RECORD AND SYSTEM FOR USING SAME

Filed March 5, 1963 2 Sheets-Sheet 1

INVENTOR
JOHN H. HOLLAND
BY Thomas S. Ross
Joseph R. Spalla
ATTORNEYS

HELICAL DATA STORAGE RECORD AND SYSTEM FOR USING SAME

Filed March 5, 1963

INVENTOR
JOHN H. HOLLAND
BY Thomas S. Ross
Joseph R. Spalla
ATTORNEYS 3,307,021

HELICAL DATA STORAGE RECORD AND SYSTEM FOR USING SAME

John H. Holland, West Hartford, Conn., assignor, by mesne assignments, to Royal Typewriter Company, Inc., a corporation of Delaware Filed Mar. 5, 1963, Ser. No. 262,992
9 Claims. (Cl. 235—61.11)

This invention relates to a novel data storage record and to a system employing such record; more particularly it relates to a disc type helical record wherein data is recorded in annular tracks adjacent the periphery of said helix; and more specifically it relates to apparatus for reading data stored in said helical records in synchronism with a unit operated by the data stored therein.

Tape and card records are generally employed in data processing systems for operating typewriters or like machines to produce work comprising variable and invariable data. The nature of tape records with respect to storage and handling and that of card records with respect to capacity leaves much to be desired. Accordingly an object of the invention is to provide a data storage record which minimizes the storage and handling drawbacks of tape records and the capacity limitations of card records.

Another object of the invention is in the provision of a disc type helical data storage record.

Still another object of the invention is in the provision of apparatus for processing helical records.

A further object of the invention is in the provision of apparatus operable in synchronism with a controlled unit for reading data stored in a disc type helical record.

A still further object of the invention is in the provision of apparatus for peripherally frictionally driving disc type helical data storage records in read and rewind directions.

A still further object of the invention is in the provision of apparatus for leading a peripherally driven helical record past a sensing station.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
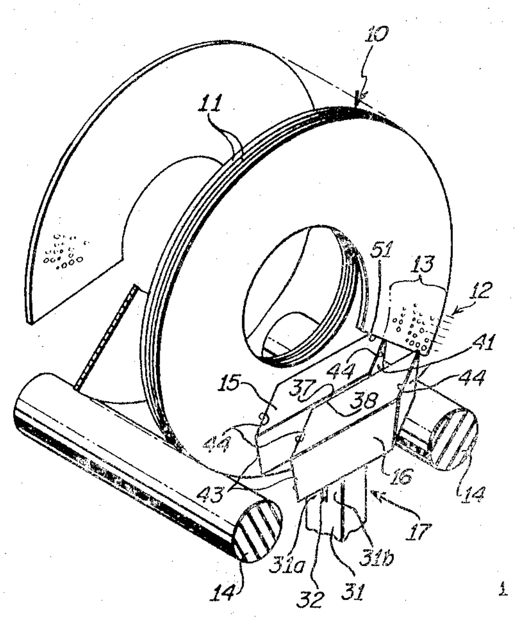
FIGURE 1 is a perspective view of a helical record showing the lead coil thereof entering a read station.

Referring now to the drawings wherein like reference characters designate like or corresponding elements throughout the several views, there is shown in FIGURE 1 a record 10 in accordance with the invention which takes the form of a helix having flat disc like coils 11. The record material may be any relatively stiff though flexible material such as paper or plastic. Recorded at radial increments 12, as by perforations, within an annular track 13 adjacent the periphery of the coils are parallel bit codes representing control and data information. The record is adapted to be frictionally peripherally and rotatably driven in clockwise or counterclockwise direction by spaced drive rollers 14 whose axes are parallel to the axis of the record. As the record is rotatably driven coil leaders 15 and 16 mounted above a read station generally designated by reference numeral 17 effect the axial translation of the record through the read station.

Figure 2:
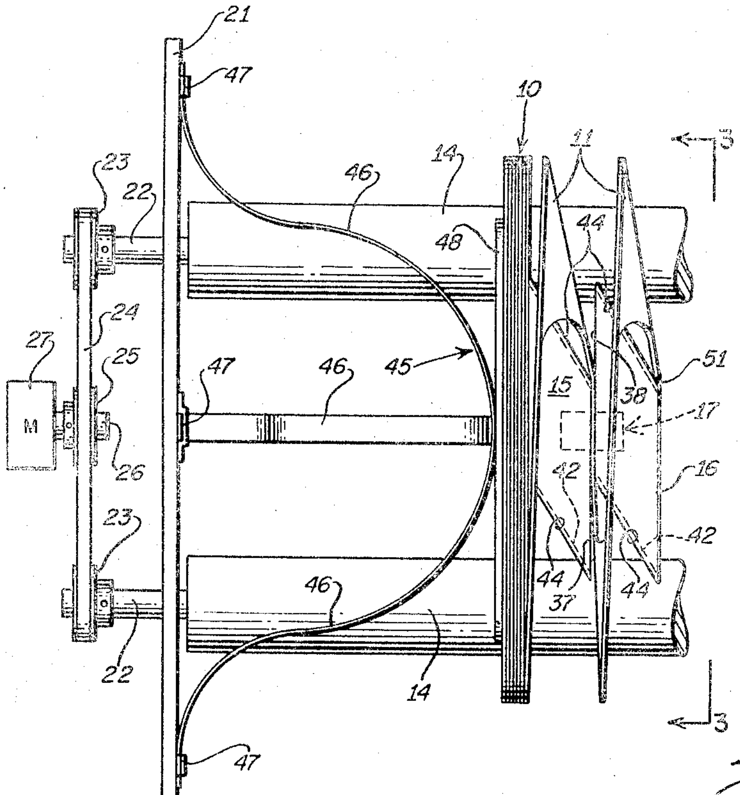
FIGURE 2 is a partial plan view of apparatus in accordance with the invention showing a helical record operatively mounted thereon.
Figure 3:
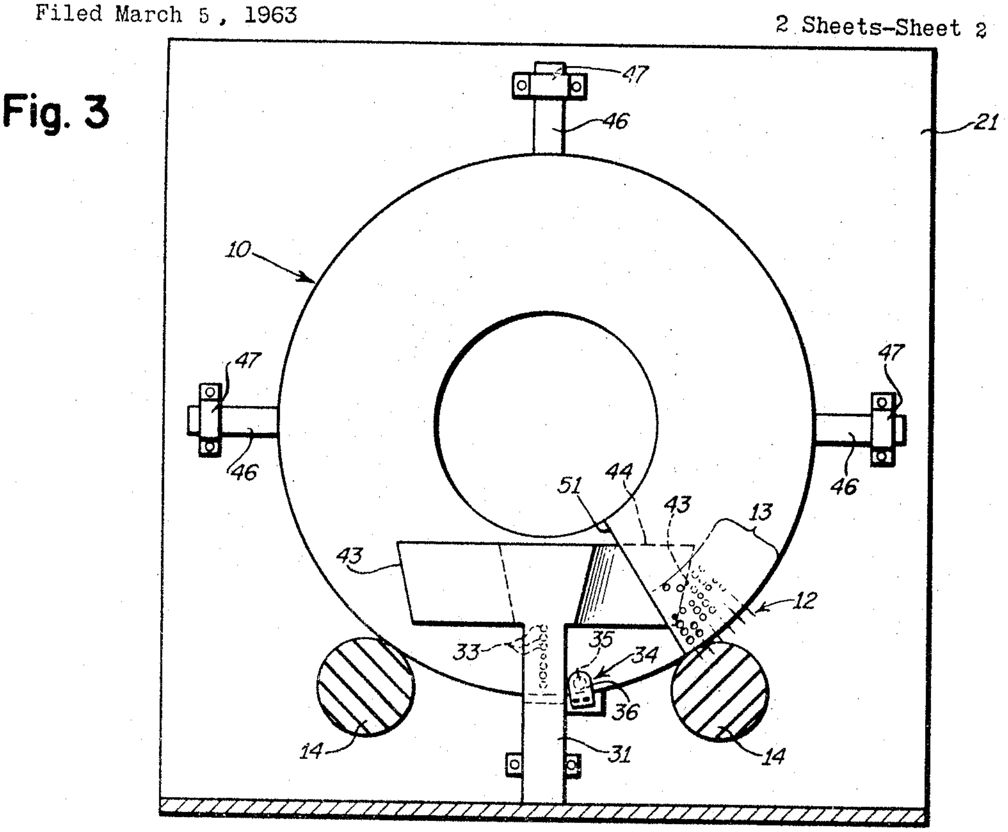
FIGURE 3 is a view taken along lines 3—3 of FIGURE 2.

With reference to FIGURES 2 and 3 there is shown a frame comprising spaced uprights 21 (one only being shown) wherein are rotatably supported the shafts 22 of the spaced drive rollers 14. Adjacent ends of each of the shafts have secured thereto a pulley 23. The pulleys 23 are connected as by a belt 24 to the pulley 25 secured to a motor shaft 26 whereby depending on the direction of rotation of a reversible motor 27 the rollers are driven in one or the other direction.

Extending upwardly between the drive rollers and intermediate the ends thereof is a vertical support 31 whose bifurcated ends 31*a* and 31*b* (FIGURE 1) define a slot 32 wherein code sensing apparatus is located. More particularly the walls defining the slot 32 are provided respectively with a light source and a vertical array of photoconductive cells 33 (FIGURE 3) which together constitute code sensing means and define therefore the read station 17. As shown in FIGURE 3 an electromagnet generally designated by reference 34 is secured to support 31 adjacent the slot entrance with its pole piece 35 and hinged armature 36 on either side of a plane coextensive with the slot 32 and so located that a record coil 11 positioned in the plane of the slot 32 may be clamped between armature and pole piece thereby arresting rotation of record 10. As is evident in FIGURE 3 the geometry of the slot and drive rollers is such that the record is supported with the code bit level tracks opposite associated photoconductive cells.

With particular reference to FIGURES 1–3 coil leaders 15 and 16 are shown secured at the top of the bifurcated ends of the support 31. Both coil leaders take the form of parallelograms in plan view as most clearly seen in FIGURE 2, whose adjacent sides 37 and 38 are parallel to and coextensive with the walls defining the read slot. As shown in FIGURES 1 and 3 the coil leaders extend to the right and left of the read slot with the right extending or forward drive portions 41 shaped to lead or effect the threading of the record in a left to right direction; and the left extending or reverse drive portions 42 (FIGURE 2) shaped to lead the record from right to left through the read slot. As shown in FIGURE 3 the apex edges 43 of the parallelogram shaped leaders are angled toward the read slot 32 thereby forming line edges 44 to facilitate threading the record through the read station with minimum friction.

An exemplary mode for assuring the initial translation of a record 10 placed on rollers 14 through the read station is shown in FIGURE 2 wherein a resilient spider 45 is supported by upright 21. More particularly the legs 46 of the spider are supported by keyways 47 on the upright whereby they may slide farther into the keyways as the spider is compressed. Secured to the spider is a pressure pad 48 which is adapted to bear against the terminal record coil of the record placed between pressure pad and the coil leader 15 as viewed in FIGURE 2. As is evident the pressure exerted on the record will vary with the length of the record; being greater for longer records. The pressure exerted however will be sufficient only to ensure the engagement of the lead edge 51 of the lead coil of the record with the apex of the coil leader 15 as shown in FIGURE 1 while insufficient to prevent rotation of the record and its movement into the read slot. Stated otherwise the frictional force between pad and record does not exceed the frictional force between record and drive rollers resulting from the weight of the record.

After the lead record coil is engaged as shown in FIG-

URE 1 the action of the rotating record and the line edge 44 of the coil leader 15 bends the record coil, and together with the flat side 38 of coil leader 16, guides the lead coil into the read slot 32. As will hereinafter appear the sensing of the first code will effect the energization of the clamp magnet 34. After the first code is processed the magnet will release the record 10 permitting it to rotate to the next code which will effect the energization of the clamp magnet, etc., whereby all the data in the record may be processed. As shown in FIGURE 2, somewhat before all the data in the lead coil has been processed, the lead edge 51, which experiences a reverse bend upon leaving the read slot 32, will engage the line edge 44 of the downstream coil leader 16 thereby providing two threads to lead the coil. The rotation of the drive rollers in reverse causes the record to be pulled through the read station by the action of the edges 44 of the reverse drive portions 42 of the coil leaders on the rotating record.

Figure 4:
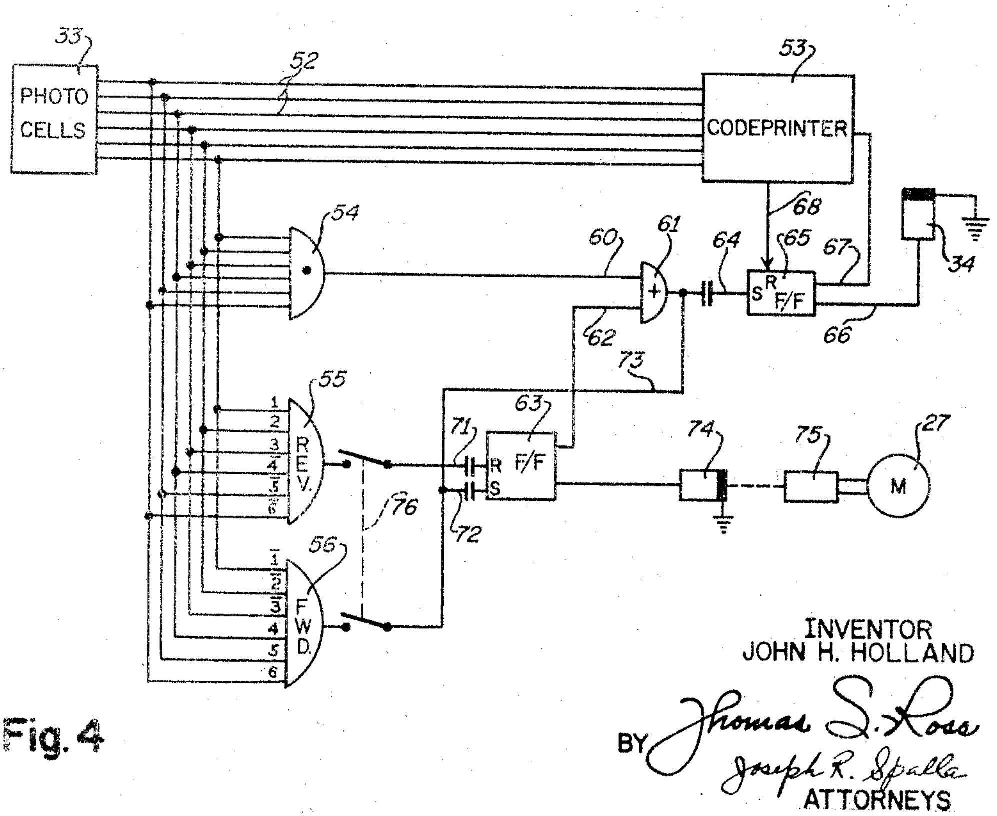
FIGURE 4 is a logic block diagram showing apparatus associated with the invention in a data processing system application.

Referring to FIGURE 4 the circuit logic whereby the spiral record may be read out and the data processed and alternatively whereby, after processing all the data, the record may be automatically rewound and read out again is shown.

Bit signals generated on lines 52 by the photoconductive cells 33 are stored in a buffer-translator within a codeprinter 53 such as disclosed in copending application of Leon Cryk, Serial No. 209,593, now Patent 3,213,195, which is operative to process the translated data in response to a start process signal and which generates a not in process signal after processing the data or, when the data on input lines 52 is not a printer function to generate a not in process signal a predetermined time after going in process.

The bit signals are also connected to an OR circuit 54 which generates an output in response to the presence of a bit signal on any one or more of the output lines 52. The bit signal lines 52 are also connected respectively to a reverse and forward code detector 55 and 56 which generate output signals only when all the bits defining the particular code are present.

Figure 5:
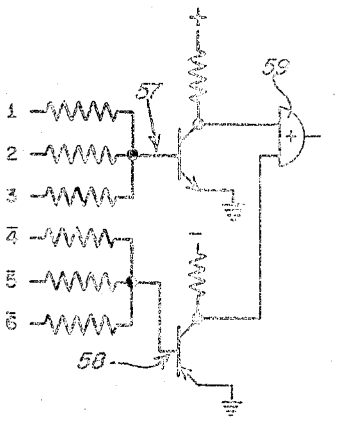
FIGURE 5 is a schematic view of a control code detector.

The forward and reverse codes will be the first and last code in the record with the reverse code perforated a predetermined distance from the terminal edge of the record as shown in FIGURE 1 for reasons which will be hereinafter apparent. As will be understood in the art, assuming a 6 bit combinational code, the reverse code may be represented by the presence of bits 1, 2 and 3 and the absence of bits 4, 5 and 6 while the forward code might be represented by the absence of bits 1, 2 and 3 and the presence of bits 4, 5 and 6. With such representation the reverse detector might comprise as shown in FIGURE 5 a $\overline{123}$ bit coincidence detector or NOR circuit 57 and a $\overline{456}$ bit coincidence detector or NOR circuit 58 having their outputs connected to an AND gate 59.

The output of the OR circuit 54 is connected to one leg 60 of an AND gate 61 whose other leg 62 is connected to one of the outputs of a reverse flip flop 63 whose normal state is such that the AND gate 61 is conditioned to pass the output of the OR gate 54. The output from AND gate 61 is connected to the set line 64 of a clamp flip flop 65 which in response to the leading edge of the gated signal switches to its other than normal state. The output lines 66 and 67 of the clamp flip flop are connected respectively to clamp electromagnet 34 and to the start process line of the codeprinter 53 whereby when flip flop 65 switches to its other than normal state, the clamp magnet is energized and the codeprinter 53 receives the command to process the data on lines 52. The in process line 68 from the codeprinter is connected to the reset line of the clamp flip flop 65 whereby a not in process signal will effect the return of flip flop 65 to its normal state thereby de-energizing the clamp magnet whereby the record may be frictionally driven to present another code at the read station.

The output of the reverse code detector 55 is connected to the reset line 71 of the reverse flip flop which will initially be in a set state. The output of the forward code detector is connected to the set line 72 of the reverse flip flop and also over line 73 to the set line 64 of clamp flip flop 65. As hereinbefore stated one of the outputs of reverse flip flop is connected to leg 62 of AND gate 61. The other output is connected to a switch relay 74 which controls a reversing switch 75 which when operated from one to another of its positions reverses the direction of rotation of motor 27. Assuming that flip flop 63 assumes its set state when power is turned on, relay 74 will not be energized and the switch contact position will be such that motor 27 will rotate in feed or forward direction. Also as flip flop 63 is in a set state AND gate 61 will be conditioned to pass a signal from OR gate 54.

Where data in a record is required to reproduce itself only once a ganged switch 76 may be opened to disable the reverse circuitry whereby the record will feed completely out of the read station, retrieved and stored until needed again.

Where data in a record is required to reproduce itself several times the lead code and terminal code respectively in the record will represent a forward and reverse code respectively as hereinbefore stated.

Assuming a record which need reproduce itself only once is placed between pressure pad 48 and coil leader 15, switch 76 will be opened to disable the reverse circuitry. When power is supplied to the motor and components as by closure of an on-off switch not shown, the motor and drive rollers will rotatably drive the record relative to coil leaders 15 and 16 which will cause the record to move through the read station from left to right as viewed in FIGURES 1 and 2. The leading edge of each code detected will set clamp flip flop 65 whereby the record will be clamped to permit the data on lines 52 to be processed after which the flip flop will reset and the record will move another increment whereby the process will repeat until the entire record is read and moves out of the read station and beyond.

When data in a record must be reproduced several times it will contain a forward and reverse code as hereinbefore noted. Further switch 76 will be closed enabling the reversing or rewind circuitry. With such a record, the initial detection of the forward code will not be effective on flip flop 63 as it is initially in set state. Hence data will be read, the record clamped, and the data processed as before until the reverse code in the terminal coil of the record is detected.

When the reverse code is detected, it will, as does every code via gate 61, set flip flop 65 which will energize the clamping magnet 34 whereby the terminal record portion provided beyond the reverse code will be clamped over the cycle time of the codeprinted 53, i.e., the time it takes to generate a not in process signal after receiving a start process signal. The detection of the reverse code will also via detector 55 reset flip flop 63 whereupon the relay will be energized and the motor reversed during the clamp interval so that when the clamp magnet is de-energized the record will be driven in the reverse direction moving from right to left. The resetting of flip flop 63 during the clamp interval will also cause gate 61 to be blocked. Hence during reverse wind, as gate 61 is blocked, no codes will be processed.

When the record has been rewound to the forward code, the detected forward code will set reverse flip flop 63 and will also, over line 73, set flip flop 65 which will effect the energization of clamp magnet over the cycle time of the printer. During the cycle time, as flip flop 63 is now back in set state, the relay will drop out whereby the motor will change its rotative direction. Hence when the flip flop 65 resets the record may be read out once again.

It should be understood that the foregoing disclosure relates to only a preferred embodiment of the invention and that it is intended to cover all changes and modifications of the example of the invention herein chosen for the purpose of the disclosure, which do not constitute departures from the spirit and scope of the invention.

The invention claimed is:

1. In combination with a helical record having flat disc-like coils, said coils having serially recorded therein along an annular track adjacent the periphery thereof coded data, a pair of spaced drive rollers adapted to peripherally support and frictionally drive said helical record, means for driving said rollers in read and rewind direction, a read station between said drive rollers, transducer means located adjacent a slot defining said read station, electromagnet means mounted at said read station adapted when energized to clamp a disc-like coil positioned in said slot against rotation by said drive rollers, and means for leading the coils of said record through said slot whereby rotation of said record successively presents serially recorded codes to said transducer means.

2. Apparatus as recited in claim 1 further comprising means for urging the lead coil of a roller supported record into initial engagement with said means for leading said coils.

3. Apparatus as recited in claim 1 further comprising means responsive to detected codes for energizing said electromagnet means over intervals sufficient to enable detected codes to be processed whereby data in said record may be serially processed.

4. Apparatus as recited in claim 3 further comprising bistable means responsive to the detection of reverse and forward codes respectively, said forward and reverse codes being located in the lead and terminal coils of said record respectively, means responsive to the switching of said bistable means upon detection of said reverse code for reversing the direction of said roller drive means during the clamp interval associated with said reverse code, means responsive to said switched bistable means for preventing the processing of codes detected during reverse roller rotation, and means responsive to a forward code for switching said bistable means to its initial state and for clamping said record over an associated clamp interval to permit restoration of said roller drive reversing means.

5. A data processing system comprising in combination, a helical record having a plurality of flat disc-like coils, said coils having codes representative of data recorded thereon along an annular track adjacent the periphery thereof, drive means for rotating said second about its axis, code sensing means positioned to sense said codes, codeprinter means connected to said sensing means responsive to a process signal to process said coded data and to generate a not in process signal when said processing is completed, braking means mounted astride one of said coils adapted when energized to frictionally engage and stop said record, and bistable means operative to an active state in response to codes sensed by said sensing means to simultaneously generate a progess signal and energize said braking means, and thereafter operative to its inactive state in response to said not in process signal generated by said codeprinter means whereby said record may be driven and subsequent codes sensed therefrom and processed.

6. A system as recited in claim 5 wherein said drive means comprises a pair of spaced drive rollers adapted to peripherally support and frictionally drive said helical record.

7. A system as recited in claim 5 wherein said braking means comprises electromagnetic means which when energized clamp a disc-like coil against rotation by said drive means.

8. A system as recited in claim 5 further comprising means for leading said coils of said record through said detecting means whereby rotation of said record successively presents coded data to said detecting means.

9. A system as recited in claim 8 further comprising means for urging the lead coil of said record into initial engagement with said means for leading said coils.

References Cited by the Examiner

UNITED STATES PATENTS

| | | | |
|---|---|---|---|
| 2,990,182 | 6/1961 | Cailliot ____________ | 179—100.2 |
| 3,064,887 | 11/1962 | Waters et al. ______ | 235—61.11 |
| 3,231,685 | 1/1966 | Kuehnle ___________ | 179—100.2 |

BERNARD KONICK, *Primary Examiner.*

JAMES W. MOFFITT, V. P. CANNEY, *Assistant Examiners.*